R. WAPLES.
RAILROAD TIE.
APPLICATION FILED APR. 20, 1916.

1,214,245.

Patented Jan. 30, 1917.
5 SHEETS—SHEET 1.

Inventor—
Rufus Waples
by his Attorneys
Howson & Howson

R. WAPLES.
RAILROAD TIE.
APPLICATION FILED APR. 20, 1916.
1,214,245.
Patented Jan. 30, 1917.
5 SHEETS—SHEET 2.
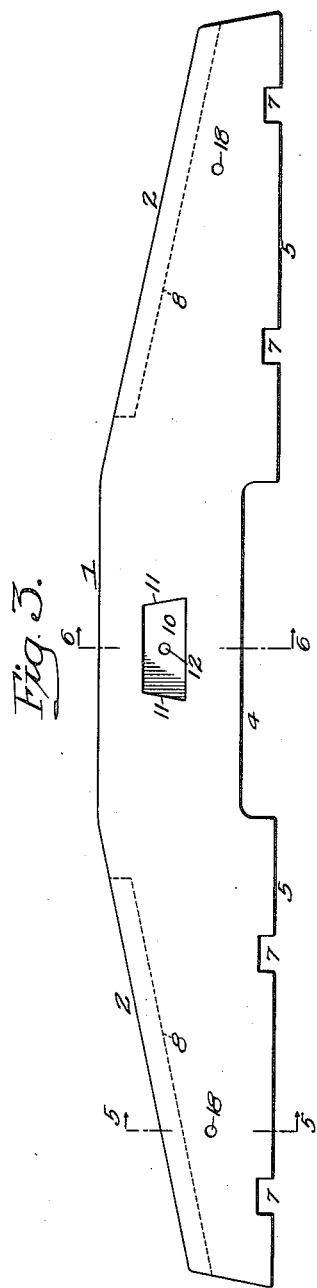
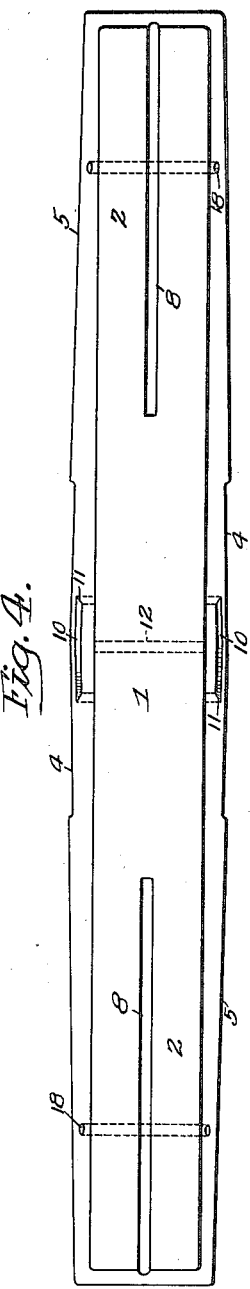
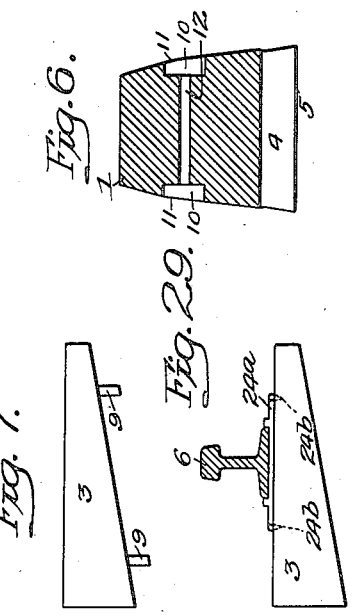
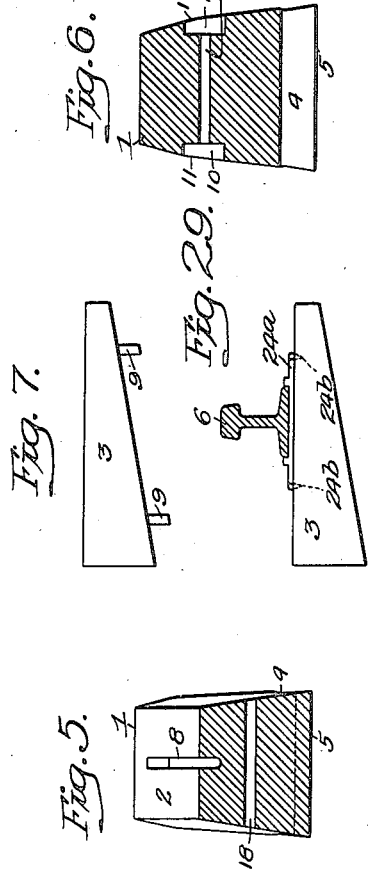
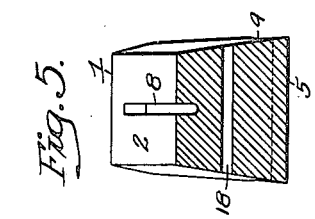
Inventor-
Rufus Waples
by his Attorneys.
Howson & Howson

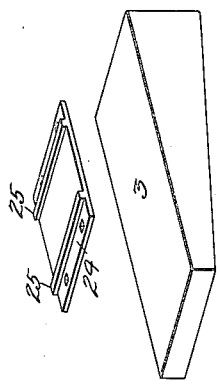
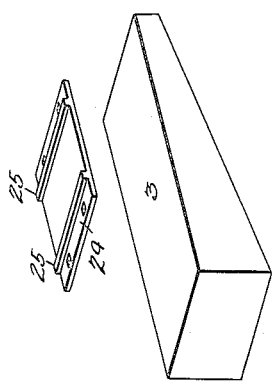
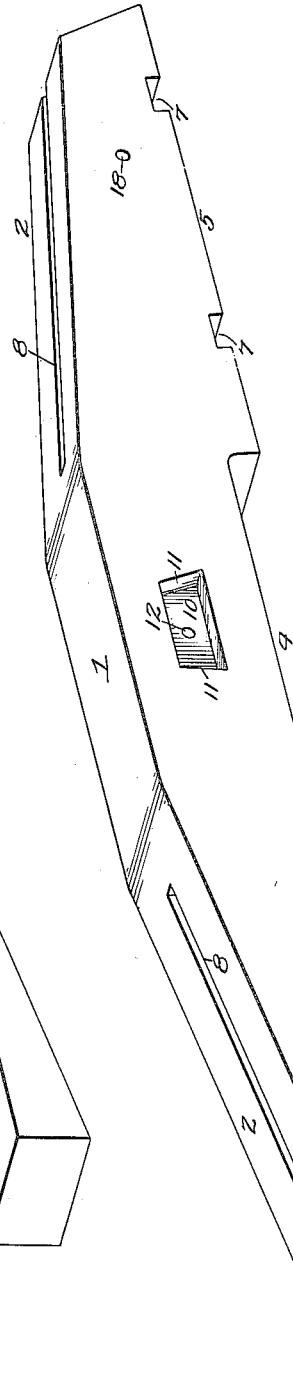
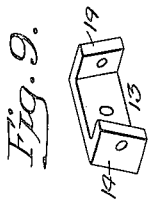
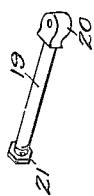

R. WAPLES.
RAILROAD TIE.
APPLICATION FILED APR. 20, 1916.
1,214,245.
Patented Jan. 30, 1917.
5 SHEETS—SHEET 4.
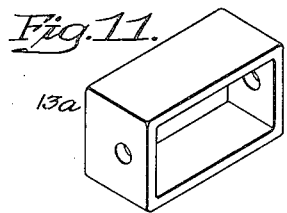
Fig. 11.
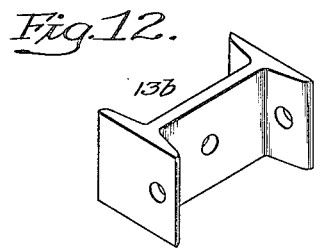
Fig. 12.
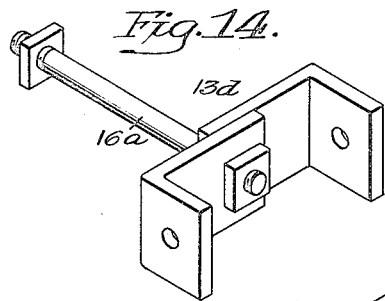
Fig. 14.
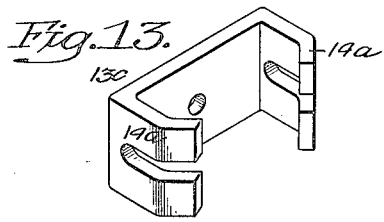
Fig. 13.
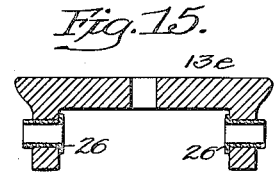
Fig. 15.
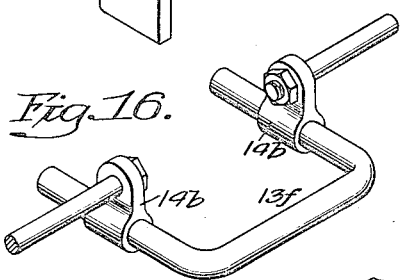
Fig. 16.
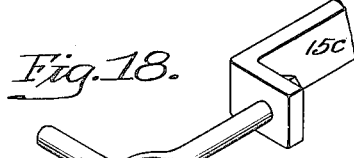
Fig. 18.
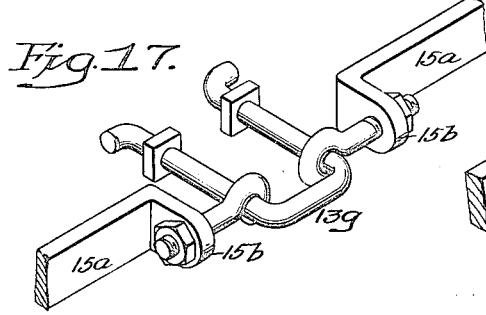
Fig. 17.
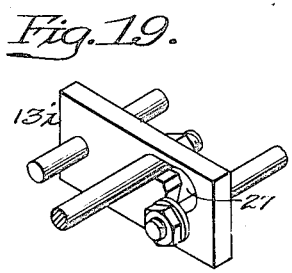
Fig. 19.
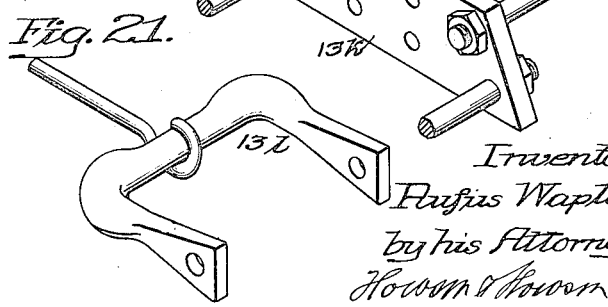
Fig. 20.
Fig. 21.
Inventor
Rufus Waples
by his Attorneys
Howson & Howson

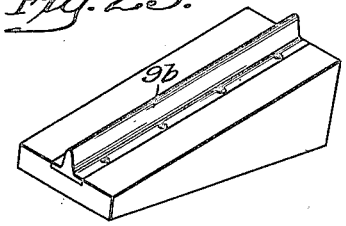
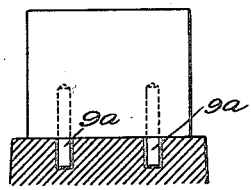
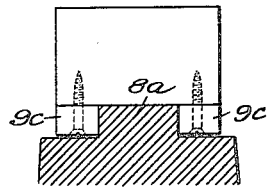
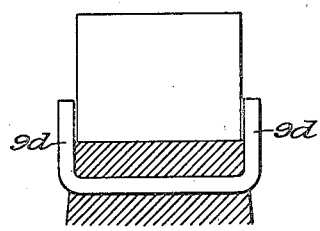
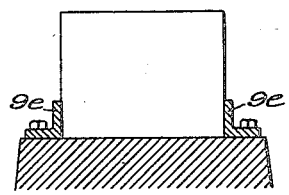
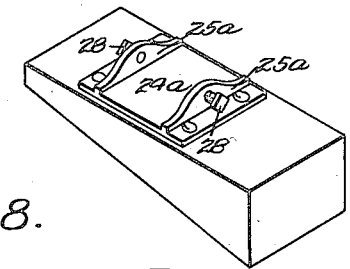
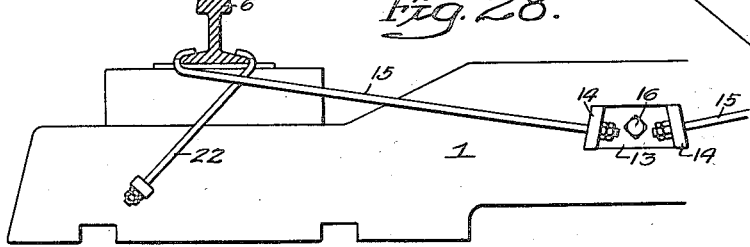
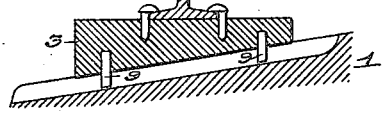

UNITED STATES PATENT OFFICE.

RUFUS WAPLES, OF WAYNE, PENNSYLVANIA.

RAILROAD-TIE.

1,214,245.

Specification of Letters Patent.  Patented Jan. 30, 1917.

Application filed April 20, 1916. Serial No. 92,467.

*To all whom it may concern:*

Be it known that I, RUFUS WAPLES, a citizen of the United States, and a resident of Wayne, county of Delaware, State of Pennsylvania, have invented certain Improvements in Railroad-Ties, of which the following is a specification.

My invention relates to certain improvements in a railroad tie for which Patents No. 924,705 and No. 925,404 were granted to me on the 15th day of June, 1909.

One object of my present invention is to improve the construction of a tie of this type.

A further object of the invention is to provide a suitable means for anchoring the tension members to the tie.

Another object of the invention is to provide means for securing the holding down rods to the tie.

A still further object of the invention is to improve the construction of the means for guiding the bearing block or wedge on the ties and retaining it in position in respect to the rail.

Figure 1:
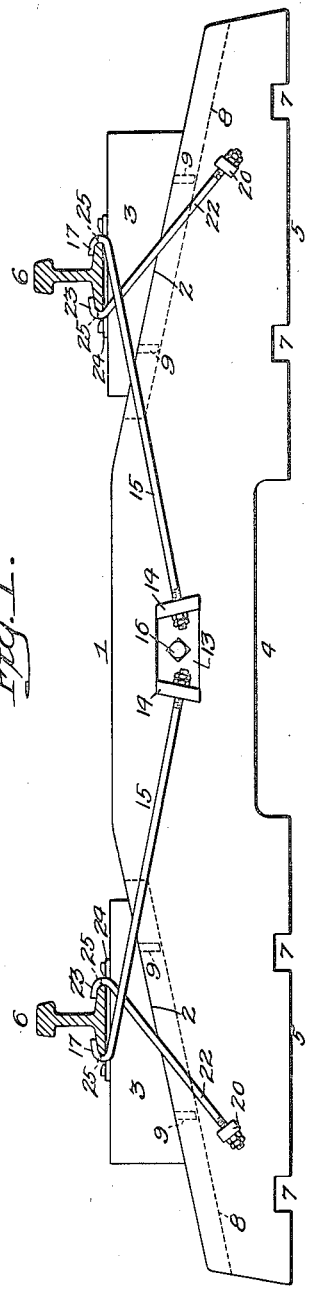
Figure 2:
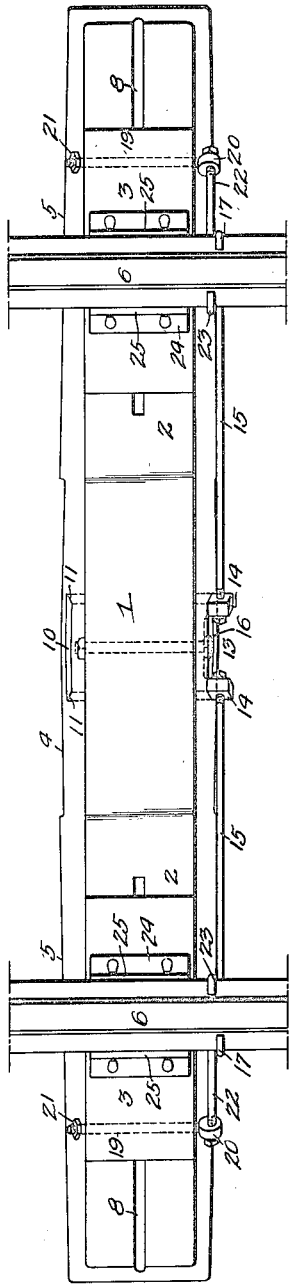

In the accompanying drawings: Figure 1 is a side view of my improved cross tie for railway rails, showing the wedges and rails in position; Fig. 2 is a plan view of the same; Fig. 3 is a side view of the concrete tie as it is cast; Fig. 4 is a plan view of the same; Fig. 5 is a transverse sectional view on the line 5—5, Fig. 3; Fig. 6 is a transverse sectional view on the line 6—6, Fig. 3; Fig. 7 is a side view of one of the wedges; Fig. 8 is a detached perspective view, showing the tie, two wedges, and the rail plates, detached; Fig. 9 is a detached perspective view of the anchor for the tension members; Fig. 10 is a perspective view of the transverse member to which the holding down rods are attached; Fig. 11 is a view of a modification of the anchor showing it in box form; Fig. 12 is another modification, showing it in the form of an I-beam; Fig. 13 is a view showing the arm slotted for the reception of the rods; Fig. 14 is a view showing the anchor made in two parts; Fig. 15 is a view showing the anchor with insulating thimbles thereon; Figs. 16, 17, 18, 19, 20 and 21 are views illustrating other modifications of the anchor; Fig. 22 is a view showing the wedge with two dowels in place; Fig. 23 is a view showing the metallic rib forming a guide for the wedge; Fig. 24 illustrates a wedge having projecting flanges at each side of the beam and a central rib on the concrete tie; Fig. 25 is a sectional view of the tie showing the wedge guides in the form of bent rods; Fig. 26 is a sectional view showing angle iron guides for the wedge secured to the tie; Fig. 27 is a perspective view showing the wedge and the rail plates with means on the rail plates for securing the plates on the rails so as to dispense with any guides on the tie for the wedges; Fig. 28 is a view illustrating my invention in connection with a rectangular bearing block; Fig. 29 is a view illustrating a modification of the rail plate; and Fig. 30 is a view illustrating spikes without the plate to hold the wedge in position.

Referring to the drawings, 1 is the cross tie made in one piece of concrete suitably reinforced, in the present instance, to sustain it against breakage due to the strains and pressure to which it is subjected. This tie is higher at the center than at the ends and is beveled toward each end, as at 2—2, forming inclined seats for the bearing blocks or wedges 3, preferably of wood or similar material. The cross tie is recessed on the under side at the center, as at 4, so as to provide two side bearing sections 5, one under each rail 6 and formed in the underside of these bearing sections are transverse grooves 7, two in the present instance, which prevent the tie from moving longitudinally after it has once settled in the road bed. This form of the under side of the tie prevents straining and breaking of the tie at the center. The inclined faces 2—2 of the tie may be at any angle desired and each face has a longitudinal groove 8 therein and driven in the under side of each wedge are guide pins 9 which extend into the grooves 8 and hold the wedges against lateral movement and form a tongue and groove connection. At the center of the tie is a recess 10 having inclined side walls 11, in the present instance, and extending from this recess to the opposite side of the tie is a central bolt hole 12 and mounted in this recess is the anchor plate 13, shown clearly in Fig. 9, having flanges 14 at right angles to a line through the tension members 15. The anchor plate is held in the recess 10 by a bolt 16, which extends through the hole 12 and has a nut, or other fastening, at its opposite end. The recess 10 is preferably formed on both sides of the tie, as shown in Figs. 4 and 6, and the nut on the end of the plate is located in the recess on the opposite side of the tie from the anchor. By this construction, the anchor plate can be placed on either side of the tie. The tension members 15 are threaded at one end and are hooked at the opposite end 17 to engage the outer base flange of the rail while the screw-threaded end extends through an opening in the flange 14 of the anchor 13 and tension can be applied by the nuts adapted to the threaded end of the tension member which bear against the flange 14 so that, by this means, the strain is taken from one rail to the other through the tension members and the anchor being an all metal connection. The anchor, however, is solidly embedded in the heaviest part of the tie some distance from the rails so that any vertical movement of the rails independently of the tie will not subject the anchor to any material strains.

In order to hold the inner flange of the rails to the wedges, I form transverse openings 18 in the ties on the outside of the vertical line of the rails and located in each of these openings is a transverse rod 19 having an eye 20 at one end and threaded at the opposite end to receive a nut and these rods are secured in position, as shown in Fig. 2, and the holding down rod 22 is passed through the eye 20 of the rod 19 and its hooked end 23 engages the inner flange of the rail, and nuts are applied to the opposite end of the rod so as to place sufficient tension on the rod to hold the rail firmly to the wedge.

24, 24 are rail plates located between the base of the rails and the wedges and are secured to the wedges by spikes. The plate has ribs 25 at each side and the space between these ribs is sufficient to accommodate the base flange of a rail so that, when the rails are in position, they hold the wedges from moving longitudinally on the inclined surface of the ties, doing away with other wedge retaining devices.

In some instances, the holding down rods 22 and the transverse rods 19 may be dispensed with and other means may be provided for holding the inner flanges of the rails to the wedges, and while I have illustrated a particular form of anchor plate at the center of the tie, this anchor plate may be modified without departing from the essential features of the invention.

In locating the tie on the roadbed, I permanently make the roadbed so that the base of the tie will rest in a fixed position thereon and then embed the tie to a depth desired by any suitable ballast, as it will be understood that in a tie of this type the tie itself, when once located in the roadbed, remains in the fixed position and is not tamped at frequent intervals, as is the case with the ordinary wooden tie, to bring the rails to the proper level. This adjustment is made by shifting the wedges on the ties so that the ties become a permanent part of the roadbed. After the ties are in position, the rails are located approximately in position upon the wedges, which are mounted on the inclined surfaces of the ties, and the rail plates are located between the rails and the wedges with their ribs extending on each side of the base flanges of the rails. The anchor plate and the transverse members 19 are secured in their respective positions in the tie either before or after the tie has been located in the roadbed and the tension members are placed in position and adjusted until the rails are at the proper gage, then the holding down rods are located and sufficient tension placed thereon to hold the inner flanges of the rails on the ties. Then the wedges 3 are driven until the rails are of the proper height after which the spikes are driven through the rail plates 24 and into the wedges so as to firmly secure the plates to the wedges. Thus the wedges are held by the rails in the proper position on the inclined surfaces of the ties. When the structure is thus assembled, the rails are properly held on the ties.

If it be desired to raise the rails, all that is necessary is to draw the short spikes that hold the plates 24 to the wedges and then the wedges can be set up and the spikes redriven. After the wedges have become worn, or have rotted for any reason, they can be readily removed and replaced at but little cost.

As hereinbefore stated, the anchors may be modified and the means for holding the wedges laterally in position may also be modified.

In Fig. 11, I have illustrated a modification in which the anchor 13$^a$ is made in the form of a box having longitudinal flanges, as well as end flanges.

In Fig. 12, I have shown the anchor 13$^b$ made in the form of a section of an I-beam, the flanges on one side being embedded in cement and the flanges on the opposite side being perforated for the extension members.

In Fig. 13, I have illustrated the anchor 13$^c$ as having slotted flanges 14$^a$, the ends of the flanges being bent inward to prevent the displacement of the tension rods, should they become loose.

In Fig. 14, I have illustrated an anchor 13$^d$ made in two parts secured together by the through bolt 16$^a$.

Fig. 15 is a view of an anchor 13$^e$ having a base with lateral, tapered beveled extensions and the beveled extensions are embedded in the cement, leaving the perforated lugs exposed. In these lugs, in the present instance, are insulating thimbles 26 which insulate the tension members from the anchor.

In Fig. 16, I have shown the anchor 13^f in the form of a bent rod having its ends embedded in the cement and having blocks 14^b mounted thereon through which the tension members extend.

In Fig. 17, I have shown the anchor 13^g also in the form of a bar bent and having its ends embedded in the cement and tension members 15^a provided with hooks 15^b at their ends engaging the anchor.

In Fig. 18, I have shown a single bolt embedded in the cement tie and an anchor 13^h having a hole through which the bolt extends and a pin for holding the anchor in position, the anchor having threaded ends which extend through right angled portions of the tension members 15^c.

In Fig. 19, I have shown the anchor in the form of a plate 13^i partly embedded in cement and having a slot 27 for the reception of the tension members.

In Fig. 20, I have shown a double anchor 13^k arranged to extend through the tie and having holes at each end for the passage of the tension members.

In Fig. 21, I have illustrated an anchor plate 13^l so shaped that the body portion of the anchor plate is embedded in the cement and the projecting ends are perforated for the passage of the tension members.

While I prefer to use the metallic dowel pins to form guides for the wedges, other means of guiding the wedges may be used without departing from the essential features of the invention.

In the main figures of the drawings, I have shown two dowel pins adapted to a single slot in the tie, but in Fig. 22 I have shown two rows of dowel pins 9^a adapted to two slots in the tie.

In Fig. 23, I have shown a T-shaped plate 9^b secured to the under side of the wedge and having a projecting portion which extends into the slot.

In Fig. 24, I have shown two flanges 9^c secured to the wedge and extending on each side of a projecting rib 8^a on the tie. In some instances, these flanges may be integral with the wedges.

In Fig. 25, I have shown one or more guide bars 9^d partially embedded in the concrete tie and having their ends projecting at each side of the wedge.

In Fig. 26, I have shown angle bars 9^e secured to the tie on each side of the wedge and acting as guides for the wedge. These angle plates may extend the full length of the wedge or may be short sections, as desired.

In Fig. 27, I have shown the rail plate 24^a secured to the upper surface of the wedge and having flanges 25^a of a greater height than those shown in Fig. 8, and I form threaded openings in these flanges for the bolts 28, which act to clamp the rail plate to the flanges of the rail so that, when the plate is secured to its wedge by the spikes, it will hold both against longitudinal and lateral displacement, doing away with any guides between the tie and the wedges.

In Fig. 29, I have illustrated a rail plate 24^a having prongs 24^b turned down from the edges of the plates which enter the wedge and hold it against longitudinal movement when once adjusted, but in Fig. 30 I have dispensed with the rail plates utilizing only the spikes to hold the wedge.

In Fig. 28, I have illustrated my invention in connection with a structure in which rectangular bearing blocks are substituted for the wedges, vertical adjustment being accomplished by the use of shims placed under the rail.

I claim:

1. The combination in a tie adapted to be firmly embedded in the roadbed, of rails located above the tie; bearing blocks between the tie and the rails; means for holding the blocks to the rails; a centrally located anchor secured to the tie; and adjustable tension members extending from the anchor to the rails.

2. The combination of a tie having beveled ends and an anchor; a wedge mounted on each beveled surface of the tie; adjustable tension members extending from the anchor to the rails; and means for retaining the wedges in position.

3. The combination of a tie having beveled ends; a wedge mounted on each beveled surface of the tie; a centrally located anchor on the tie; adjustable tension members extending from the anchor to the rails; and rail plates secured to each wedge and having flanges extending at each side of the base flange of the rail.

4. The combination of a tie having an inclined surface at each end; a wooden wedge mounted on each inclined surface; a flanged rail plate secured to the upper surface of each wedge so as to receive the base flange of the rails; a central anchor secured to the tie; tension members extending from the anchor to the outer flange of each rail; and holding down rods secured to the tie and engaging the inner flanges of the rails.

5. The combination of a tie having an inclined bearing surface at each end; a bearing block mounted on each inclined surface and arranged to support the rails; a tongue and groove connection between the block and the tie; and means for holding the rails onto the blocks.

6. The combination of a concrete tie having an inclined surface at each end; a wedge mounted on each inclined surface; an anchor plate located at the center of the tie and secured thereto; and tension members extending from the anchor plate and engaging the rails so as to hold the rails in alinement.

7. The combination of a concrete tie having an inclined surface at each end; a wedge mounted on each inclined surface; rails mounted on the wedges; a flanged anchor embedded in the tie; and tension members secured to the flanges of the anchor and engaging the rails to hold said rails in proper alinement.

8. The combination of a concrete tie having a beveled surface at each end; a wedge mounted on each beveled surface; rails supported by the wedges, the tie being recessed at one side at or near the center; an anchor mounted in the recess; a transverse bolt securing the anchor to the tie; and tension members connecting the anchor with the rails.

9. The combination of a concrete tie having a beveled inclined surface at each end; a wedge on each inclined surface; rails supported by the wedges; an anchor; tension members connecting the anchor with the base flanges of the rails; a transverse member extending through the tie near each end beyond the rails and having an eye; and a holding down rod extending through the eye and engaging the inner flange of the rail.

10. The combination of a concrete tie having an inclined surface at each end; a longitudinal groove in each surface; a wedge mounted on the inclined surface and having a portion extending into the groove in the inclined surface to guide the wedge laterally; a flanged rail plate secured to the wedge and arranged to engage the base flange of the rail; and means for securing the rails to the tie.

11. The combination of a concrete tie having an inclined surface at each end; a longitudinal groove in each inclined surface; a wedge mounted on each inclined surface; dowel pins projecting from each wedge into the groove; rails mounted on the wedges; and means for holding the rails in position on the tie.

12. The combination of a concrete tie having an inclined surface at each end; a wedge mounted on each inclined surface; a rail plate secured to the upper surface of each wedge, each rail plate having flanges extending on each side of the base flange; and means on said flanges for securing the rail plate to a rail so as to hold the wedges laterally in position on the inclined surface of the tie.

13. A concrete tie formed of an integral casting, said tie having tapered sides and being larger at the base than at the upper end and having an inclined wedge-receiving surface at each end and having longitudinal grooves in each bearing surface; and a central recess for the reception of an anchor plate and transverse grooves in its under side.

RUFUS WAPLES.